W. S. LOCKE.
GASKET.
APPLICATION FILED NOV. 8, 1909.

967,650.

Patented Aug. 16, 1910.

Witnesses.
E. R. Pollard
E. Coleman,

Inventor:
William S. Locke.
By Howard Strause
Attorneys.

UNITED STATES PATENT OFFICE.

WILLIAM S. LOCKE, OF LOS ANGELES, CALIFORNIA, ASSIGNOR OF TWENTY-FIVE AND FIFTY ONE-HUNDREDTHS PER CENT. TO COLLIN S. ROBINSON, TWENTY-FOUR AND FIFTY ONE-HUNDREDTHS PER CENT. TO HAROLD J. HEFFRON, AND TWENTY-FOUR AND FIFTY ONE-HUNDREDTHS PER CENT. TO R. B. BLODGET, ALL OF LOS ANGELES, CALIFORNIA.

GASKET.

967,650.  Specification of Letters Patent.  Patented Aug. 16, 1910.

Application filed November 8, 1909. Serial No. 526,754.

*To all whom it may concern:*

Be it known that I, WILLIAM S. LOCKE, a citizen of the United States, residing at Los Angeles, in the county of Los Angeles and State of California, have invented new and useful Improvements in Gaskets, of which the following is a specification.

This invention relates more particularly to a fabric gasket provided with an expansible means, and a main object thereof is to provide means whereby the wear occasioned by the operation of a gasket will be effectually provided for.

A further object is to provide a novel form of gasket whereby the expansible means is incorporated therein and forms a part thereof.

In the accomplishment of the above objects I preferably employ a plurality of fabric strips cut on the bias to prevent raveling and wrapped in a tubular form, in combination with a wrapping or layer of a resilient substance interposed between the fabric wrappings and attached thereto.

Figure 1:
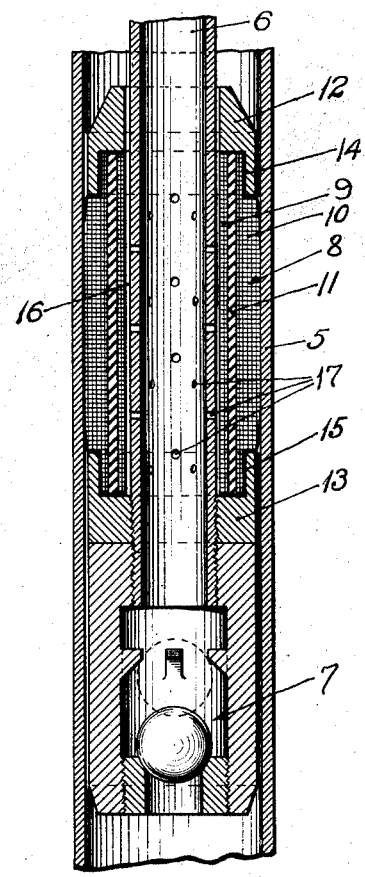
Figure 2:
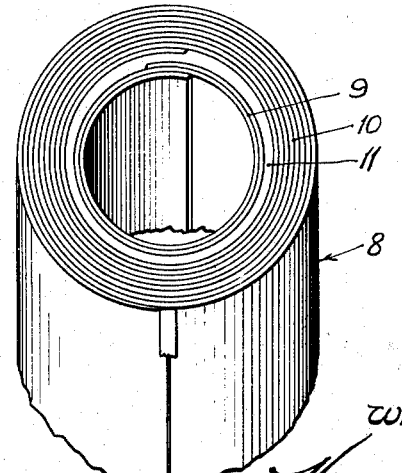

In the drawings attached hereto and forming a part of this specification: Figure 1— is a longitudinal section through the gasket, showing it in an operative relation to a pump rod and casing. Fig. 2— is a fragmentary sectional perspective of the gasket.

Heretofore in the pumping of oil wells and the like, the gaskets employed have been formed entirely of fabric wrapped and secured together in a tubular form, no provision being made for the wear occasioned the periphery of the gasket from its frictional engagement with the perimeter of the pump casing, thus necessitating a frequent replacement of the gasket.

By the employment of my improved gasket construction, all leakage around the plunger of the pump is eliminated as well as frictional wear on the periphery of the gasket is provided for by the resilient expander, thus contributing materially to the economical and efficient operation of the pump.

Referring more especially to the drawings, 5 designates a pump casing of usual construction, (a portion only being shown) 6 a hollow pump rod, and 7 a ball valve of usual construction in screw threaded engagement with the lower end thereof.

The gasket 8 is preferably of a tubular form, and is constructed of a plurality of layers of fabric 9, 10, the fabric being cut on the bias to prevent raveling. Inside layer 9 preferably consists of two wrappings, while the outside layer consists of several wrappings, being greatly in excess of the number of the inside wrappings. Interposed between the two wrappings is an expansible or resilient member 11 preferably of a cylindrical layer of rubber vulcanized thereto, the thickness of this layer depending entirely on the amount of resiliency needed and also on the diameter of the gasket.

Preferably attached at either end of the gasket is a metallic thimble 12, 13, the upper thimble 12 being held in engagement with the gasket by a layer of rubber 14 vulcanized thereto. The lower thimble 13 is in screw threaded engagement with the lower end of the pump rod and is also cemented to the gasket by a layer of rubber 15 similar to the upper thimble. The inside diameter of the gasket is preferably slightly greater than the outside diameter of the pump rod, the purpose being to form a small cylindrical oil chamber 16, a plurality of apertures 17 formed in the pump rod communicating therewith.

It will be observed from an inspection of Fig. 1 of the drawings that when the gasket is in operative position on the rod 6 that the periphery thereof is in frictional engagement with the perimeter of the pump casing, this frictional engagement being desirable in pumping operations and which is often difficult to constantly maintain. By the employment of an expansible resilient member, as heretofore explained, the oil or other fluid drawn upwardly by the pump valve is forced through the apertures in the hollow rod into chamber 16 and forces or expands the gasket into a frictional contact with the casing, thus insuring a non-leaking packing and providing for excessive wear of the gasket.

The upper part of the pump rod is provided with an oil outlet valve of usual construction (not shown).

It will be apparent that in employing a gasket of the above described type that changes in form may be readily accomplished, the expansible member 11 performing the functions in a satisfactory manner equally as well without the interposition of the oil chamber 16.

Having described my invention what I claim as new and desire to secure by Letters Patent is:

1. In a gasket construction, the combination of a pump valve and rod of usual construction, of a gasket consisting of a plurality of flexible members, a layer of rubber interposed therebetween, and a metallic thimble vulcanized to the gasket at each end thereof, said thimbles being detachably secured to said pump rod.

2. A gasket construction, comprising a plurality of flexible members, an expansible member therebetween, and a metallic end piece vulcanized at each end of said gasket.

3. A gasket construction, comprising two fabric layers, a layer of rubber therebetween, and a metallic thimble vulcanized to the rubber layer at each end thereof.

In witness that I claim the foregoing I have hereunto subscribed my name this 30th day of October, 1909.

WILLIAM S. LOCKE.

Witnesses:
  EDMUND A. STRAUSE,
  ETHEL COLEMAN.